UNITED STATES PATENT OFFICE.

GEORGE REUSS, OF WILMINGTON, DELAWARE.

VARNISH.

SPECIFICATION forming part of Letters Patent No. 314,607, dated March 31, 1885.

Application filed May 12, 1884. (No specimens.)

*To all whom it may concern:*

Be it known that I, GEORGE REUSS, a citizen of the United States, residing at Wilmington, in the county of New Castle and State of Delaware, have invented certain new and useful Improvements in Varnish; and I do declare the following to be a full, clear, and exact description of the invention, such as will enable others skilled in the art to which it appertains to make and use the same.

To prepare my improved varnish, I first prepare an oil as follows: First boil together a quart of water and a gallon of linseed-oil. To the boiling oil and water are then added the following ingredients: one-half pound of red lead, one-half pound of litharge, one-half pound of burnt umber, and one-half pound of white lead. Each of these ingredients is done up separately in a muslin bag and suspended in the boiling oil and water until dissolved. The boiling is continued until all of the water is expelled. One pound of crushed amber and one-fourth pound of gum-mastic are then melted separately. When melted, a mixture of one quart of hot turpentine and one-half gallon of the boiling oil, as prepared above, are poured upon the melted amber and gum-mastic, the whole being carefully stirred until the amber and gum-mastic are thoroughly dissolved.

A varnish thus prepared works perfectly free under the brush, is of a brilliant luster, and when applied is dry and hard. It is peculiarly adapted for finishing the exterior of railway-cars, hot cinders and sand having no effect whatever upon it.

It is to be understood that I do not confine myself to the exact proportions of the ingredients given above, as they may be departed from somewhat without affecting the character of the varnish; but the proportions which I have given are those which I employ and which give the best results.

I claim as my invention—

A varnish consisting of an oil composed of linseed-oil, red lead, litharge, burnt umber, and white lead, in combination with turpentine, amber, and gum-mastic, prepared substantially as set forth.

In testimony whereof I affix my signature in presence of two witnesses.

GEO. REUSS.

Witnesses:
HENRY C. CONRAD,
JOSEPH W. VANDEGRIFT.